(12) United States Patent
Harris et al.

(10) Patent No.: US 7,391,506 B2
(45) Date of Patent: Jun. 24, 2008

(54) LASER RADAR DEVICE AND METHOD

(75) Inventors: Michael Harris, Malvern (GB); David Arthur Smith, Malvern (GB); Adrian Sean Coffey, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 11/578,720

(22) PCT Filed: May 18, 2005

(86) PCT No.: PCT/GB2005/001943

§ 371 (c)(1),
(2), (4) Date: Oct. 18, 2006

(87) PCT Pub. No.: WO2005/114253

PCT Pub. Date: Dec. 1, 2005

(65) Prior Publication Data

US 2007/0171396 A1     Jul. 26, 2007

(30) Foreign Application Priority Data

May 19, 2004   (GB)   ................................. 0411097.9

(51) Int. Cl.
*G01P 3/36*      (2006.01)
(52) U.S. Cl. .................... 356/28.5; 356/337; 356/342
(58) Field of Classification Search ................ 356/28.5, 356/337, 342

See application file for complete search history.

(56) References Cited

U.S. PATENT DOCUMENTS 4,735,503 A     4/1988   Werner et al.

(Continued)

FOREIGN PATENT DOCUMENTS

JP       2000-0107 A     1/2000

(Continued)

OTHER PUBLICATIONS

International Search Report of PCT/GB2005/001943, mailed Sep. 7, 2005.

(Continued)

*Primary Examiner*—Thomas H. Tarcza
*Assistant Examiner*—Timothy A Brainard
(74) *Attorney, Agent, or Firm*—Nixon & Vanderhye P.C.

(57)                  ABSTRACT

A coherent laser radar or lidar device (2;20;84;90) for measuring wind speed is described that comprises a transmitter for transmitting a beam of light to a remote probe volume (6;54), a receiver for detecting back-scattered light and an analyzer for calculating wind velocity at the remote probe volume from the Doppler shift in frequency of the detected back-scattered light. The analyzer is arranged to monitor for the presence of, and/or to ensure the calculated wind speed is corrected for, any Doppler frequency components of the detected back-scattered light that arise from back-scatter off cloud located at a range greater than the range of the remote probe volume. It is described how the lidar (2;20;84;90) may be scanned and wind velocity components calculated by fitting the scanned line of sight velocity values to a predetermined function. Furthermore, it is outlined how an initial fit may be performed to determine which points are to be used in this calculation. The incorporation of a back scatter profiling means, such as ceilometer (82), is also described. A wind turbine (902) incorporating such a device (90) is also described.

25 Claims, 7 Drawing Sheets

U.S. PATENT DOCUMENTS

Figure 1:
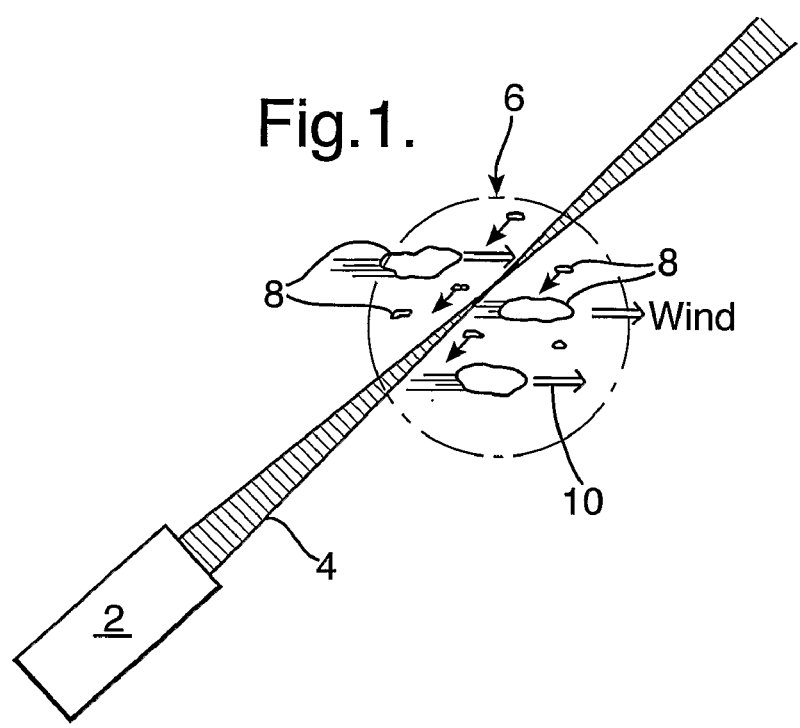

| | | | |
|---|---|---|---|
| 5,214,484 | A | 5/1993 | de Mollerat du Jeu et al. |
| 5,724,125 | A * | 3/1998 | Ames ........................ 356/28.5 |
| 6,644,128 | B1 * | 11/2003 | Byatt et al. .............. 73/861.26 |
| 2002/0189875 | A1 * | 12/2002 | Asanuma et al. ............ 180/169 |
| 2003/0067681 | A1 * | 4/2003 | Mazzone et al. ............ 359/454 |
| 2003/0189711 | A1 * | 10/2003 | Orr et al. ..................... 356/484 |
| 2004/0001462 | A1 * | 1/2004 | Yavuz et al. ................ 370/333 |

FOREIGN PATENT DOCUMENTS

| | | |
|---|---|---|
| JP | 2000-2763 | 1/2000 |
| SE | 522 181 C2 | 4/2004 |
| WO | 03/100458 A1 | 12/2003 |
| WO | 2004/034084 A1 | 4/2004 |

OTHER PUBLICATIONS

GB Search Report of GB0411097.9, dated Oct. 13, 2004.
Raham; "Measurement of a Wind Field With an Airborne Continuous-Wave Doppler Lidar", Optics Letters, Optical Society of America, vol. 20, No. 2, Jan. 15, 1995, pp. 216-218, XP000486650.
Morse et al.; "The Nima method for improved moment estimation from Doppler spectra", Journal of Atmospheric and Oceanic Technology, vol. 19, No. 3, pp. 274-295, Mar. 2002.

* cited by examiner

LASER RADAR DEVICE AND METHOD

This application is the US national phase of international application PCT/GB2005/001943, filed 18 May 2005, which designated the U.S. and claims priority of GB 0411097.9, filed 19 May 2004, the entire contents of each of which are hereby incorporated by reference.

The present invention relates to coherent laser radar (lidar) devices and a method for operating such devices.

Lidars are well known and have been used to measure wind profiles for many years. The basic principle of a lidar device is to direct a laser beam to a point or region in space and to detect the returned signal. Measurement of the Doppler shifted light baclc-scattered by small natural particles and droplets (aerosols) present in the atmosphere is used to provide a measure of the line of sight wind speed. If the laser beam is scanned, multiple wind velocity components can be determined allowing more information on the wind vector to be calculated.

An example of an early, carbon dioxide laser based, idar is described in Vaughan, J M et al: "Laser Doppler velocimetry applied to the measurement of local and global wind", Wind engineering, Vol. 13, no. 1, 1989. More recently, optical fibre based lidar systems have also been developed; for example, see Karlsson et al, Applied Optics, Vol. 39, No. 21, 20 Jul. 2000 and Harris et al, Applied Optics, Vol. 40, pp 1501-1506 (2001). Optical fibre based systems offer numerous advantages over traditional gas laser based systems. For example, optical fibre based systems are relatively compact and can be fabricated using standard telecommunication components which are moderately priced and typically very reliable.

Following the recent increase in the exploitation of wind power, there is now a requirement for anemometers that are capable of making reliable wind speed measurements over prolonged periods of time. These routine wind speed measurements may be used to assess the suitability of proposed wind turbine sites, to measure the power extraction efficiency of existing wind turbines or even to form part of a wind turbine control system. Traditionally, mechanical "cup" anemometers have been used to make such measurements but this often requires the construction of masts or towers to enable the device to be mounted at the height above the ground at which wind speed measurements are required. This can prove quite costly, especially where the assessment of numerous potential sites is required.

Although optical fibre based lidars have the potential to replace the traditional cup anemometer, this will only occur if and when it can be ensured that the data acquired over prolonged periods of time is at least as reliable as that produced by known mechanical systems. To date, concerns over the long term reliability of wind speed data acquired using lidar based anemometers has hindered their uptake as replacements for traditional mechanical cup anemometer based systems.

It is thus an object of the present invention to provide a lidar device for atmospheric wind speed measurements, and a method of operating such a device, that provides reliable measurements over prolonged periods of time. It is a further object of the invention to provide an improved method of analysing data acquired by a lidar device.

According to a first aspect of the present invention, a coherent laser radar device for atmospheric wind speed measurement comprises a transmitter for focussing a beam of light to a remote probe volume, a receiver for detecting back-scattered light, and an analyser for calculating wind speed at the remote probe volume from the Doppler shift in frequency of the detected back-scattered light, characterised in that the analyser is arranged to monitor for the presence of, and/or to ensure the calculated wind speed is corrected for, any Doppler frequency components of the detected back-scattered light that arise from back-scatter off cloud located at a range greater than the range of the remote probe volume.

As outlined above, prior art coherent laser radar devices are inherently reliable in the sense that they comprise optical transmitters that will accurately and reliably transmit a beam of light in a known direction and receivers that can consistently detect back-scattered light from a known direction with a substantially invariant sensitivity. In ideal conditions, prior art coherent laser radar devices are thus capable of acquiring highly accurate wind speed information for a remote probe volume of interest. However, it has been found that under certain atmospheric conditions significant errors are associated with the wind velocity values calculated by such prior art coherent laser radar device. In particular, it has been found that in the presence of a low cloud base the detected back-scattered signal can be dominated, or at least comprise a significant component, that does not actually arise from reflections off aerosols in the probe volume of interest but is due to reflections from the higher density of aerosols (water droplets) found in cloud. In such a situation, prior art coherent laser radar devices provide a "false" wind speed reading that is not truly indicative of the wind velocity in the remote probe volume because of the effect of the cloud returns.

The present invention thus provides a lidar device in which an analyser is provided that is arranged to monitor for the presence of, and/or to ensure the calculated wind speed is corrected for, any Doppler frequency components of detected back-scattered light that arise from back-scatter off cloud located at a range greater than the range of the remote probe volume (i.e. for light reflected from aerosols outside of the remote probe volume). A device of the present invention thus has a reduced susceptibility to false readings due to cloud, or at least provides an indication that the calculated wind velocity values have been affected by a cloud return signal and are likely to have a certain level of uncertainty associated therewith.

A device of the present invention thus ensures the operator has greater confidence in the wind velocity values calculated by the lidar. For example, the indication may be in the form of an error output associated with each calculated velocity value or it may be that only velocity values having a certain confidence level associated therewith are output or recorded by the lidar. In other words, the device comprises means for providing an indication of the confidence associated with calculated wind velocities. The present invention thus provides a lidar device that, unlike prior art systems, is capable of making reliable long term, unattended, wind velocity measurements even in the presence of an intermittent and/or varying cloud base.

It should be noted that the back-scattered light detected by the receiver provides a measure of the "line of sight" wind velocity; i.e. the returned light is Doppler shifted by an amount related to the velocity components of aerosols parallel to the transmit/receive beam direction. However, different wind velocity components can advantageously be determined by providing scanning means to scan the beam of light transmitted by the transmitter and the receive beam defined by the receiver within the remote probe volume. Scanning the lidar in this manner enables the wind vector within the remote probe volume to be intersected at a number of known angles thereby allowing the true wind velocity vector to be constructed and thus enabling various velocity components to be measured. The implementation of a scanned lidar device in accordance with the present invention is described in more detail below.

Furthermore, it should be noted that the term "receive beam" is well known to those skilled in the art and is used to denote the direction from which any returned light will be collected by the receiver optics and passed to the detector. In other words the receive beam is not a beam of photons, but simply a pseudo or virtual beam that defines a volume in space from which back-scattered light can be detected. It should also be noted that herein the term "remote probe volume" is used to define the 3D region in space from which wind velocity data is required. In the case of a non-scanned beam, the remote probe volume will be defined by the transmit/receive beam overlap and/or focus, whilst for a scanned device the remote probe volume will additionally be defined by the scan pattern. For example, in the case of a conical scan the remote probe volume will be a disc of air having a radius defined by the scan angle and a thickness defined by the depth of focus of the transmit/receive beams.

Preferably, the transmitter comprises a variable focus mechanism thereby enabling the range of the remote probe volume to be varied as required. The receiver may also have a variable focus mechanism. Advantageously, the device is, arranged such that, during use, the focus of the receive beam is arranged to coincide with the focus of the transmit beam. The transmit beam output by the transmitter and the receive beam defined by the receiver may thus both have a variable focal distance which, in the case of an upwardly directed device, allows the height (i.e. altitude) of the remote probe volume from the ground to be varied as required. The variable focus mechanism may be arranged to provide a continuously variable focus, or it may be arranged to provide any one of a plurality of focus conditions.

Advantageously, the device is arranged to sequentially measure wind speed at a plurality of measurement remote probe volumes, wherein each of said plurality of measurement remote probe volumes is at range less than a first range limit. Herein, the term "measurement remote probe volume" refers to a probe volume in which wind speed data is required; i.e. it a probe volume of interest. In the case of an upwardly pointing device, the measurement remote probe volumes may be located at any number of heights of interest. For example, the first set of measurements may be at the height of proposed or actual wind turbine blades, say, 50 m 100 m and 150 m above ground level. The device may also or alternatively be arranged to measure, in parallel, wind speed at a plurality of measurement remote probe volumes, wherein each of said plurality of measurement remote probe volumes is at range less than a first range limit.

Conveniently, the transmitter is additionally arranged to focus the beam of light to at least one reference remote probe volume, said at least one reference remote probe volume being at a range greater than said first range limit. Herein, the term "reference remote probe volume" refers to a probe volume in which wind speed data may not be required but from which a cloud return signal can be collected if cloud is present. The reference remote probe volume(s) is typically located at a height at which the presence of a cloud return would produce a measurable return signal for measurements made at the measurement remote probe volumes. For example, the reference remote probe volume may be located 300 m above ground level. It should be noted that, if required, a wind velocity could be calculated for the reference remote probe volume; for example, the measurement could be used to provide a measure of cloud velocity.

The Doppler frequency characteristics of the back-scattered light detected when the transmitter is focussed to said at least one reference remote probe volume may advantageously be used by the analyser during the calculation of wind speed at each of said plurality of measurement remote probe volumes. In one example, the analyser may be advantageously arranged to produce Doppler spectra comprising the intensity of the detected back-scattered light as a function of Doppler shift frequency for each measurement at each of said measurement and reference remote probe volumes, wherein the calculation of wind speed comprises subtracting at least one reference Doppler spectrum from each of the measurement Doppler spectra.

It should be noted that the device may be arranged to continuously acquire wind speed data. Doppler spectra may thus be acquired at each measurement remote probe volume in turn followed by, or preceded by, a measurement at the reference remote probe volume(s). This acquisition cycle may then be repeated for as long as required. It should also be noted that data may be acquired from the remote probe volumes in any order, although acquiring data for sequentially increasing range reduces the magnitude of focus adjustment required between measurements. A plurality of lidar devices, or a wavelength multiplexed lidar, may alternatively or additionally be used to take a plurality of measurements at different heights in parallel. Furthermore, the device may be arranged to take a number of measurements in each probe volume (e.g. it may comprise conically scanned beam) as described in more detail below.

A device is thus provided in which the wind speed calculated at each remote probe volume of said first set is substantially unaffected by any Doppler frequency components of the detected back-scattered light that arise from back-scatter off cloud located at a range greater than the first range limit. In other words, Doppler spectra acquired for ranges greater than the range limit are used by the analyser to correct the wind speed determined from the Doppler spectra at a range less than the first range limit. It should be noted that the first range limit would typically be less than the range to the typical atmospheric cloud base for the region of measurement. It should also be emphasised that the first range limit does not refer to the maximum instrumented range of the device but to the limit of the range of interest for measurements.

The analyser may advantageously be arranged to monitor the intensity of the detected back-scattered light as a function of Doppler shift frequency for the presence of two or more discrete intensity peaks; i.e. for peaks that occur at different Doppler frequencies.

Advantageously, the analyser is arranged such that, in the presence of two or more discrete intensity peaks, the wind velocity at the remote probe volume is determined from the intensity peak at the lower Doppler shift frequency. In this manner, any contribution to the calculated wind velocity arising from the Doppler return from fast moving cloud is removed. Although this technique relies on the assumption that cloud is moving at a faster speed than wind in the remote probe volume, it can still provide accurate wind velocity data in the many situations.

Advantageously, the device additionally comprises an atmospheric back-scatter profiling means (e.g. an atmospheric back-scatter profiler) for measuring the back-scatter cross-section of the atmosphere as a function of range. Accordingly, a coherent laser radar device may be provided that includes a wind Doppler lidar and an atmospheric back scatter profiler. The atmospheric back-scatter profiler is preferably a pulsed laser radar device which allows back-scatter to be accurately measured as a function of range. The output beam of the atmospheric back-scatter profiler is preferable directed along the same path, or a substantially similar path, as the beam of light transmitted by the transmitter.

The provision of such back-scatter profiling means ensures that, for an upwardly pointing lidar system, any error introduced by the presence of a low cloud base can be monitored. This should be contrasted to prior art lidars in which the back-scattered signals detected by the receiver of an upwardly pointing lidar can be dominated, in the presence of a low cloud base, by back-scatter from the highly scattering cloud rather than by the back-scatter from aerosols in the remote probe volume. This occurs because although the lidar has the greatest sensitivity to light back-scattered from the remote probe volume, it still has some sensitivity to light returned from outside of the remote probe volume. Therefore, as described in more detail below, if the amount of scattering that occurs outside of the remote probe volume is significantly greater than the amount of scattering that occurs within the remote probe volume, the overall return signal will not necessarily be dominated by the back-scatter from aerosols in the remote probe volume. A lidar incorporating a back-scatter profiling means thus significantly reduces the possibility of making "false" wind speed measurements, and provides a more robust and reliable system suitable for making long term, unattended, measurements.

Advantageously, the atmospheric back-scatter profiling means comprises a ceilometer. Ceilometers are known pulsed lidar devices, and have been used for many years to measure cloud height in the vicinity of airports and the like. Although the provision of a separate pulsed lidar is preferred for simplicity and to enable simultaneous back-scatter profile and wind speed measurements, the skilled person would appreciate that it would also be possible to adapt the coherent laser radar that provides the wind speed measurements to additionally operate in a pulsed mode to measure the back-scatter profile.

Alternatively, the atmospheric back-scatter profiler may comprise means for determining the power of the detected back-scattered light as a function of the distance of the remote probe volume from the device. In other words, the optical power of the back-scattered light collected by the receiver may be used as an indication of the scattering strength at a particular height. Assuming the characteristics of the lidar are known, the returned power as a function of remote probe volume range can then provide a backscatter profile. The distance of the remote probe volume from the device can be readily controlled by varying, for example, its focus.

Advantageously, the analyser is arranged to take the back-scatter profile measured by the atmospheric back-scatter profiler and to use said back-scatter profile to ensure the calculated wind speed is corrected for any Doppler frequency components of the detected back-scattered light that arise from back-scatter off cloud located at a range greater than the range of the remote probe volume (i.e. to provide an indication of whether the calculated wind velocity is characteristic of the wind velocity at the remote probe volume). In other words, the atmospheric back-scatter profiling means provides a profile of the back-scattering cross-section as a function of range. This back-scatter/range profile is then used, in combination with the known or previously measured sensitivity properties of the coherent laser radar, to determine the proportion of the back-scattered light collected by the receiver that arises from back-scatter off aerosols in the remote probe volume. It is then possible for the device to provide an indication of whether the calculated wind velocity is likely to be characteristic of the true wind velocity at the remote probe volume. In many cases, a simple "0" (invalid reading—cloud signal dominates) or "1" (valid reading—aerosol signal dominates) is sufficient. Alternatively, a more detailed measure of the uncertainty associated with calculated velocity could be calculated.

Accordingly, wind velocity measurement apparatus is provided that comprises a coherent continuous wave lidar device and a non-coherent pulsed lidar device such as a ceilometer. An atmospheric back-scatter profile is determined by the pulsed lidar device and used, in combination with the known (e.g. predicted or measured) sensitivity of the continuous wave lidar device, to determine the region of space being probed by the continuous wave lidar device. The data provided by the ceilometer is thus used in a calculation that allows the proportion of back-scattered light that arises from the remote probe volume to be assessed.

It should be noted that the coherent transmitted beam and the pulsed beam of the back-scatter profiling means should be similar in wavelength. The similar wavelengths are required as the back-scatter properties of the atmosphere are wavelength dependent. However, for minor differences in wavelength, a simple calibration factor can be used to convert the back-scatter properties at the wavelength of operation of the back-scatter profiling means to the wavelength of operation of the coherent beam. Preferably, there should thus be less than a factor of ten or more preferably less than a factor of two difference in the wavelength of light used by the coherent and pulsed systems.

Advantageously, scanning means are provided to scan the beam of light transmitted by the transmitter within the remote probe volume.

Conveniently, the analyser is arranged to determine a line of sight wind velocity value for a plurality of known scan positions within the remote probe volume and to calculate at least one wind velocity component at the remote probe volume by fitting the plurality of line of sight velocity values to a predetermined function. Doppler spectra may thus be acquired by the lidar at a plurality of known positions within the remote probe volume from which multiple line of sight velocity values are calculated. Assuming uniform air flow through the remote probe volume, a plot of the line of sight velocity values versus position can be fitted to a certain predetermined mathematical function and various wind velocity components within the remote probe volume can be extracted.

Preferably the predetermined function is a sinusoidal function and the scanning means is arranged to conically scan the beam of light transmitted by the transmitter and the receive beam defined by the receiver. In the case of a ground based upwardly pointing lidar device performing a scan about a vertical axis, the offset (i.e. the DC component) of the sine curve provides a measure of the vertical wind velocity component, the amplitude of the sine wave gives a measure of the horizontal velocity component whilst the phase of the sine curve provides an indication of the wind bearing component. It should be noted that the analyser may operate using any co-ordinate system; for example, the positional information may be expressed in Cartesian or polar co-ordinates as required.

The analyser may be arranged to perform an initial fit of the plurality of line of sight velocity values to the predetermined function and to determine, from the initial fit, which of the plurality of line of sight velocity values are to be used to calculate the at least one wind velocity component at the remote probe volume. Conveniently, the analyser is arranged such that one or more line of sight velocity values acquired during the scan are omitted from the calculation of the at least one wind velocity component.

The plurality of line of sight velocity values used to calculate the at least one wind velocity component at the remote probe volume may comprise the line of sight velocity values having a deviation from the initial fit less than a predetermined amount. In other words, the analyser may be arranged to omit potentially spurious points (e.g. points having a deviation from the initial fit greater than a predetermined amount) from the calculation that determines the at least one velocity component. These spurious points may arise from solid objects (e.g. insects, birds, vehicles, aircraft etc) moving in the transmit/receive beam path.

Conveniently, the plurality of line of sight velocity values used to calculate the at least one wind velocity component at the remote probe volume exclude the N line of sight velocity values having the highest deviation from the initial fit, wherein N is a predetermined integer greater than or equal to one and less than the number of line of sight velocity values. In other words, an initial fit of the plurality of line of sight velocity values to the predetermined function is performed and the result of the initial fit includes a measure of the deviation of each measured line of sight velocity value from the best fit curve. In the subsequent data fit which is used to calculate the wind velocity components, the N data points with the highest deviation from the initial fit are omitted. The value of N is greater than or equal to one and preferably less or significantly less than the number of acquired line of sight velocity values. The preferred value of N will be dictated by the environment in which the lidar is located, and may be 1, 2, 3, 4 ,5 or greater than 5, 10, 15 or 20.

In this manner, the accuracy of the calculated wind velocity values are unaffected by occasional spurious line of sight velocity values arising from any backscatter other than that produced by aerosols in the remote probe volume. A scanned lidar system may thus be provided in which the analyser is arranged to determine the presence of any spurious line of sight velocity data points and to exclude such spurious data points when calculating wind velocity.

Advantageously, fitting the plurality of line of sight velocity values to a predetermined function is performed using a least sum of squares technique. A number of suitable fitting routines are commercially available; for example NAG (National Algorithms group) routines could be employed.

Conveniently, the device is monostatic. In other words, the receiver and transmitter share common optics that form substantially parallel and overlapping transmit and receive beams. Furthermore, the focus of the transmit and receive beams is always coincident when such a monostatic arrangement is used.

Alternatively, the device could be bistatic. In this case, the transmitter and receiver comprise discrete and separate optical arrangement. For such a bistatic system, it is preferred to ensure the transmit and receive beams are focussed at the same range and also that the two beams intersect at their points of focus. A device comprising means for simultaneously altering the focus and "squint" of a bistatic arrangement is described in PCT patent application GB03/04408.

Advantageously, the back scattered light collected by the receiver is mixed with a local oscillator signal extracted from the light source of the transmitter prior to detection. In this manner, a heterodyne detection system is provided. This allows the Doppler shift data to be readily extracted from the beat frequency of the local oscillator and returned (i.e. back-scattered) light.

Conveniently, the transmitted beam of light comprises infrared radiation. For example, the device could incorporate a solid state laser and may be arranged to operate at the 1.55 µm telecommunications wavelength. It should also be noted that herein the term "light" is used to describe visible and non-visible radiation of any wavelength from the deep ultra-violet to the far infra-red. The lidar may be arranged for CW or pulsed operation.

Preferably, the transmitter and receiver comprise optical components linked by optical fibre. Preferably, the device comprises at least one piece of optical fibre. Fibre based systems of this type can be fabricated using "off the shelf" optical components and are relatively cheap, robust and reliable.

Conveniently, the device is arranged for ground based, upwardly directed, operation. In other words, the device is arranged to be pointed substantially vertically and to measure the wind velocity in a remote probe volume located a certain height above the ground. Ground based operation may include use of the lidar on a buoyant platform.

A coherent laser radar device for measuring wind speed is thus described herein that comprises a transmitter for transmitting a beam of light to a remote probe volume, a receiver for detecting back-scattered light and an analyser for calculating wind velocity at the remote probe volume from the Doppler shift in frequency of the detected back-scattered light, wherein means are provided for indicating whether, and/or for ensuring that, calculated wind velocities are characteristic of the wind velocity at the remote probe volume.

A coherent laser radar device for atmospheric wind speed measurement may thus be provided that comprises: a transmitter for focussing a beam of light to a remote probe volume, a receiver for detecting back-scattered light, and an analyser for calculating wind speed at the remote probe volume from the intensity of back-scattered light detected by the receiver as a function of Doppler shift frequency, wherein the analyser is arranged such that the wind speed calculation excludes any Doppler frequency components that arise due to back-scattering from aerosols (e.g. cloud) located at a range greater than the range at which the transmitted beam of light is focussed.

A coherent laser radar device for atmospheric wind speed measurement is also described that comprises: a transmitter for focussing a beam of light to at least a first remote probe volume located a range R from said device, a receiver for detecting back-scattered light, and an analyser for calculating wind velocity at the remote probe volume of interest from any Doppler shift in frequency of the detected back-scattered light, characterised in that an error detector is provided to determine any Doppler shift components of the detected back-scattered light that arise from scattering of light at a range greater than the range R.

A wind turbine, or a wind farm comprising multiple wind turbines, may comprise at least one coherent laser radar device of the type described herein. Conveniently, any such coherent laser radar device is arranged to measure the velocity of wind at a remote probe volume upwind of the wind turbine. The beam of light transmitted by the coherent laser radar device may be passed through the region of space swept by the blades of the wind turbine. In such a configuration, the analyser may be arranged such that reflections from the turbine blades do not affect the calculated wind velocity measurements.

According to a second aspect of the invention, a method for calculating atmospheric wind velocity comprises the steps of (i) taking Doppler frequency data acquired by a coherent laser radar device from a remote probe volume and (ii) calculating wind velocity at the remote probe volume of the coherent laser radar device from said Doppler frequency data, characterised in that step (ii) comprises the step of monitoring said Doppler frequency data for the presence of, and/or ensuring the calculated wind speed is corrected for, any Doppler frequency components that arise from back-scatter off cloud located at a range greater than the range of the remote probe volume. In this manner, the step,of calculating wind velocity at the remote probe volume of the coherent laser radar device from Doppler frequency data comprises providing an indication of whether, and/or ensuring that, the calculated wind velocity is characteristic of wind velocity at the remote probe volume.

Advantageously, said Doppler frequency data comprises a plurality of Doppler spectra (i.e. received intensity as a function of Doppler frequency) acquired from a plurality of remote probe volumes.

Preferably, said plurality of Doppler spectra comprise a first set of Doppler spectra acquired from one or more measurement remote probe volumes at a range less than a first range limit and a second set of Doppler spectra acquired from one or more remote probe volumes at a range greater than said first range limit.

Conveniently, step (ii) comprises the step of using said second set of Doppler spectra to ensure the wind speed calculated from each of said first set of Doppler spectra is corrected for any Doppler frequency components that arise due to back-scatter off cloud. The method of calculation of wind speed may also comprise the step of subtracting a Doppler spectrum of said second set from each Doppler spectra of said first set.

Conveniently, the method comprises the additional step of taking a back-scatter profile measured by an atmospheric back-scatter profiling means located in the vicinity of the coherent laser radar device and using the back-scatter profile to provide an indication of whether the calculated wind velocity is characteristic of the wind velocity at the remote probe volume. The back-scatter profile may thus be used to monitor said Doppler frequency data for the presence of any Doppler frequency components that arises from back-scatter off cloud located at a range greater than the range of the remote probe volume.

Advantageously, said Doppler frequency data comprises a plurality of Doppler spectra acquired from each remote probe volume, wherein each of said plurality of Doppler spectra are acquired from a known scan position within said remote probe volume. A line of sight velocity value may then be calculated from each Doppler spectra of each scan position within said remote probe, wherein the step of calculating wind velocity at a remote probe volume comprises the step of fitting at least some of said line of sight velocity values to a predetermined function.

Advantageously, the data acquired by the coherent laser radar device comprises a plurality of line of sight wind velocity values measured at a plurality of known scan positions within the remote probe volume and the step of calculating wind velocity at the remote probe comprises performing an initial fit of the plurality of line of sight velocity values to the predetermined function and selecting, from the initial fit, which of the plurality of line of sight velocity values are to be used in the step of calculating the at least one wind velocity component at the remote probe volume.

The line of sight velocity values selected for use in the step of calculating the at least one wind velocity component at the remote probe volume may conveniently comprise line of sight velocity values having a deviation from the initial fit less than a predetermined amount. Alternatively or additionally, the line of sight velocity values selected for use in the step of calculating the at least one wind velocity component at the remote probe volume may advantageously exclude the N line of sight velocity values having the highest deviation from the initial fit, wherein N is a predetermined integer greater than or equal to one and less than the number of line of sight velocity values.

In other words, the at least some line of sight velocity values selected for use in the step of calculating the at least one wind velocity component at a remote probe volume comprise line of sight velocity values having a deviation from an initial fit less than a predetermined amount. Alternatively, the at least line of sight velocity values selected for use in the step of calculating the at least one wind velocity component at a remote probe volume exclude the N line of sight velocity values having the highest deviation from an initial fit, wherein N is a predetermined integer greater than or equal to one and less than the number of line of sight velocity values.

Conveniently, the Doppler frequency data may comprise the intensity of detected back-scattered light as a function of Doppler shift (i.e. Doppler spectra), wherein the step of calculating wind velocity at the remote probe volume comprises analysing said data for the presence of two or more discrete peaks at different Doppler frequencies, wherein the line of sight wind velocity at the remote probe volume is determined from the peak at the lower Doppler shift frequency.

Step (i) of the above described method may comprise the step of using a coherent laser radar device to acquire Doppler frequency data from at least one remote probe volume; i.e. the method may comprise the initial step of using a coherent laser radar device to acquire data.

A computer program may also be provided for implementing the above method. A computer program carrier containing, in machine readable form, a computer program suitable for implementing the above method may also be provided. A computer suitably programmed to implement the above described method may also be provided.

According to a third aspect of the invention, a method of coherent laser radar operation comprises the steps of; (i) focussing a beam of light to a remote probe volume, (ii) detecting back-scattered light, (iii) calculating the wind speed at said remote probe volume from the Doppler shift in frequency of the detected back-scattered light, characterised in that step (iii) comprises the step of monitoring for the presence of, and/or ensuring the calculated wind speed is corrected for, any Doppler frequency components of the detected back-scattered light that arises from back-scatter off cloud located at a range greater than the range of the remote probe volume.

A method of calculating wind velocity is also described that comprises the steps of (i) taking data acquired by a coherent laser radar device and (ii) calculating wind velocity at the remote probe volume of the coherent laser radar device from said data, and is characterised in that the step of calculating wind velocity at the remote probe volume of the coherent laser radar device from said data comprises providing an indication of whether, and/or ensuring that, the calculated wind velocity is characteristic of wind velocity at the remote probe volume.

Figure 2:
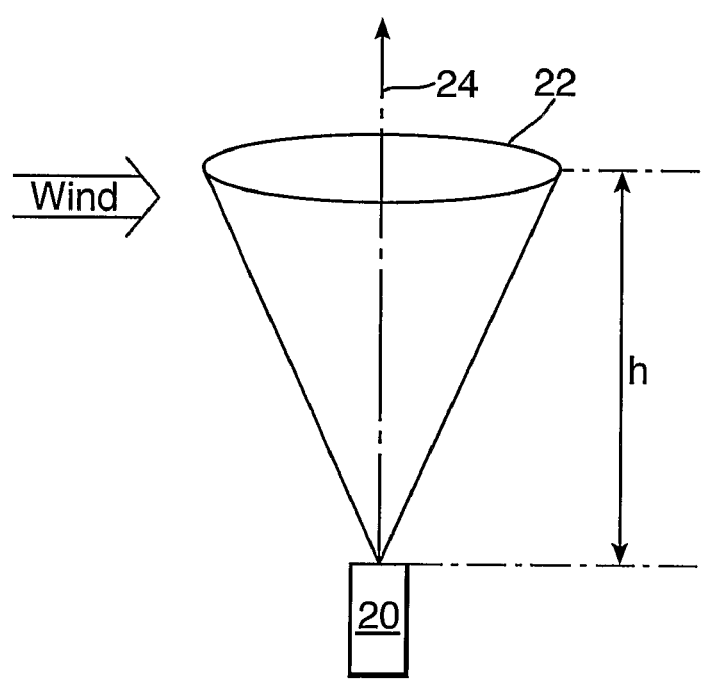
Figure 3:
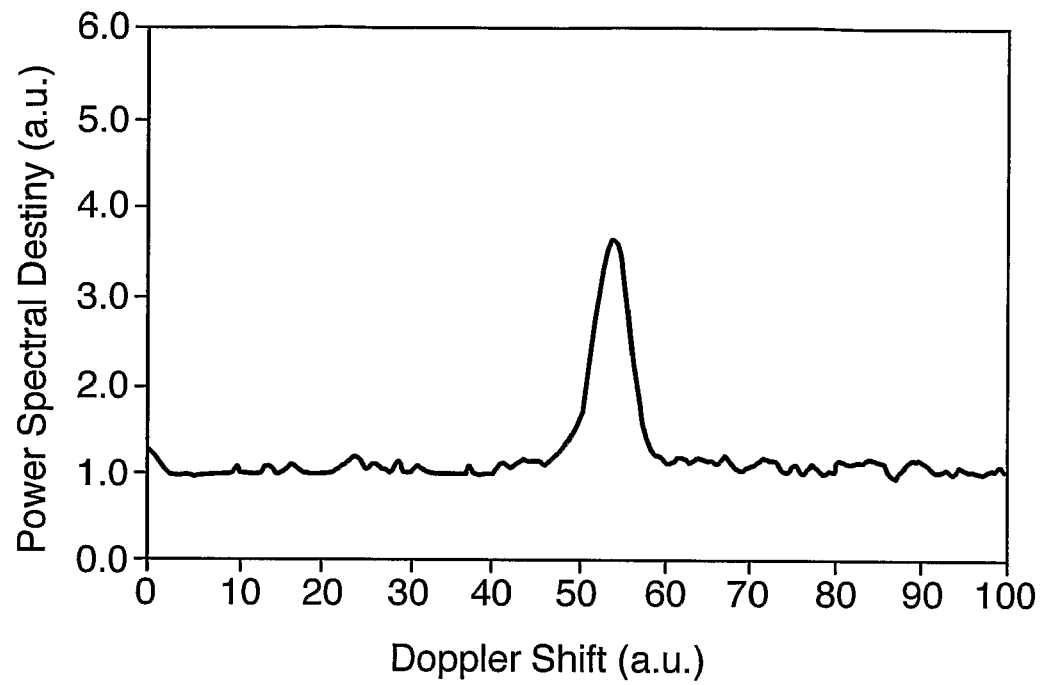
Figure 4:
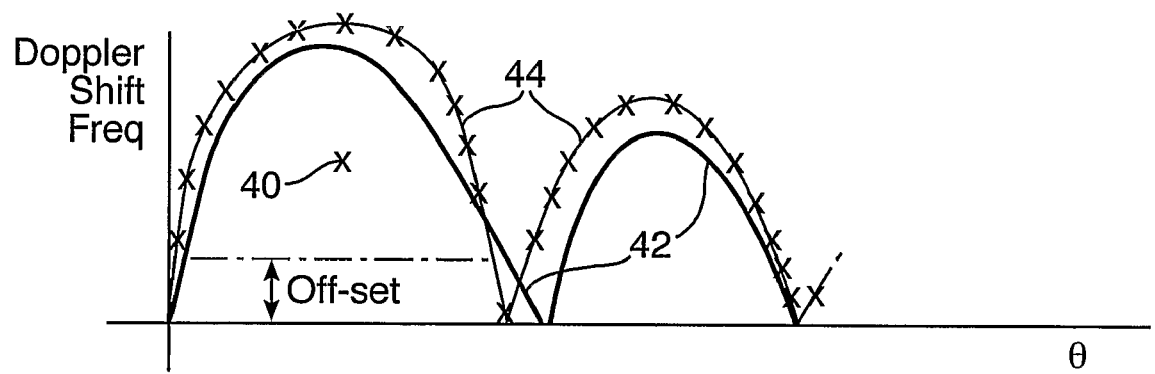
Figure 5:
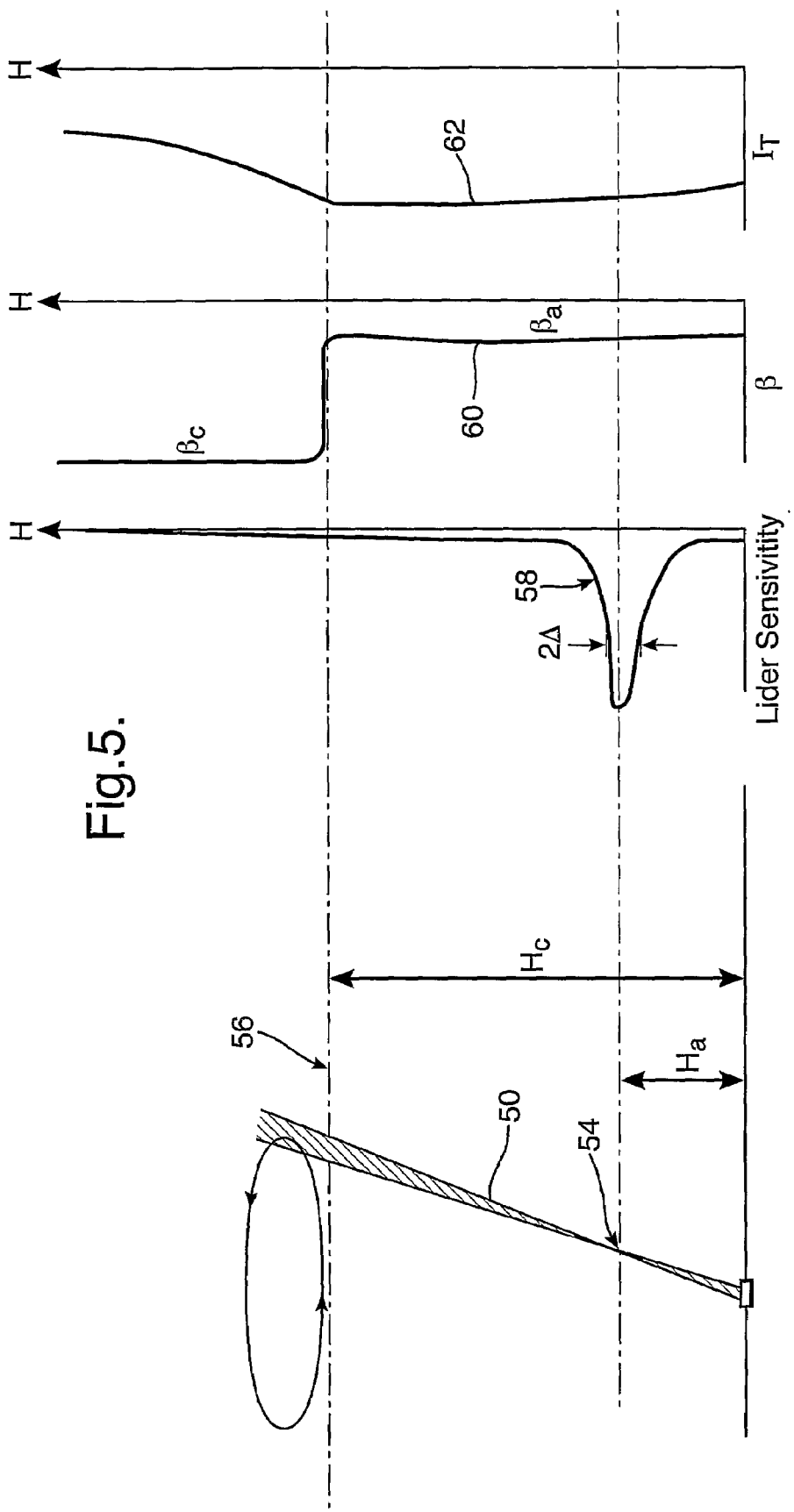
Figure 6:
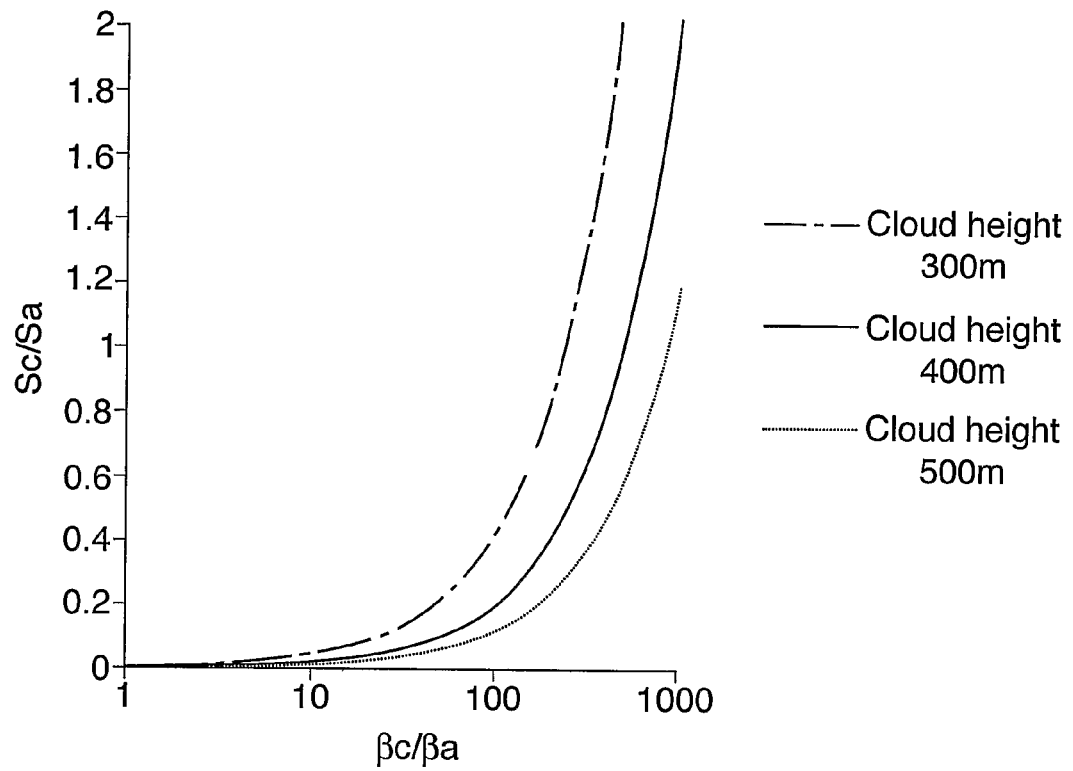
Figure 7:
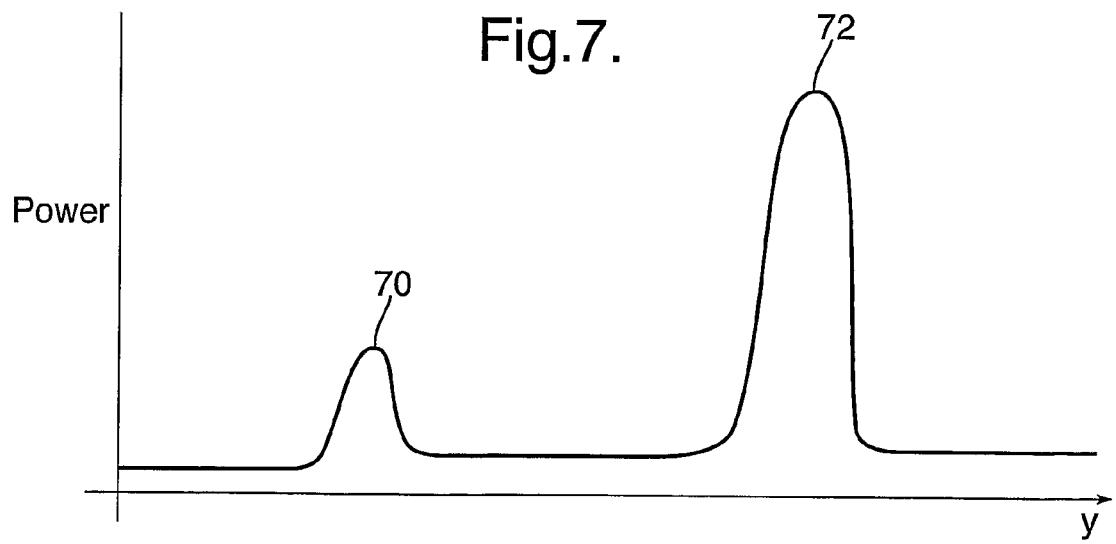
Figure 8:
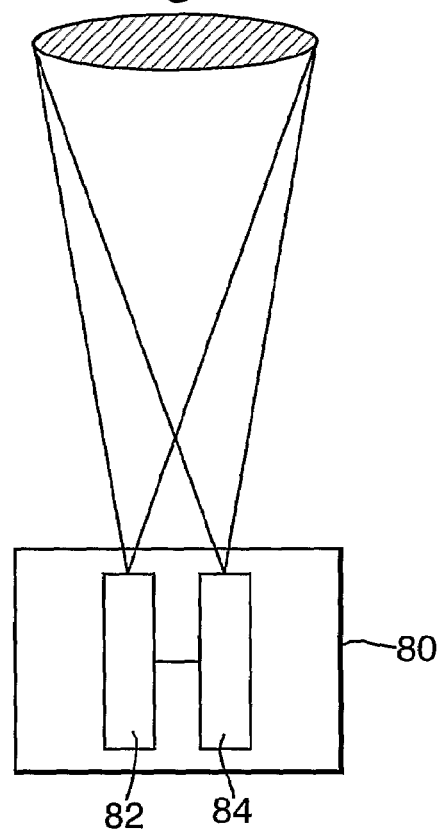
Figure 12:
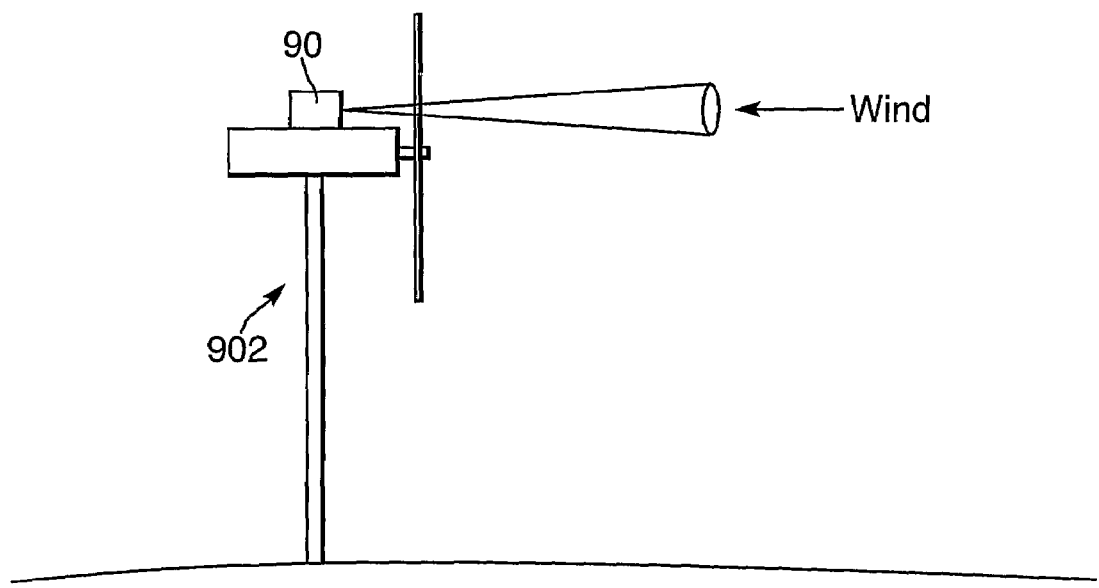
Figure 9:
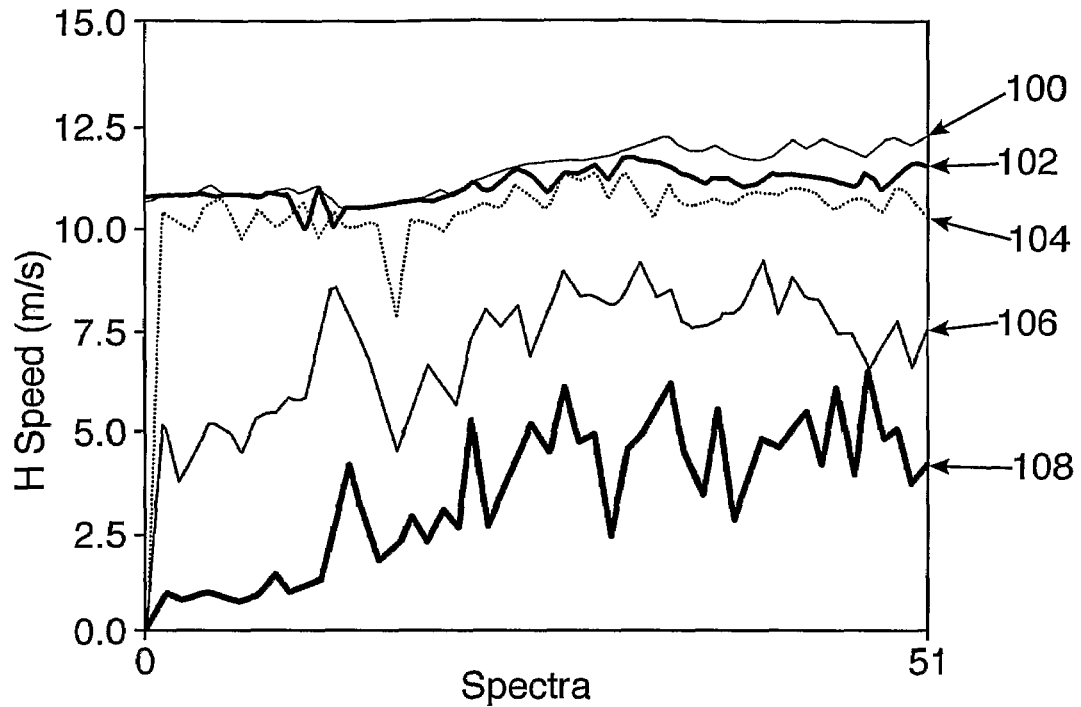
Figure 11:
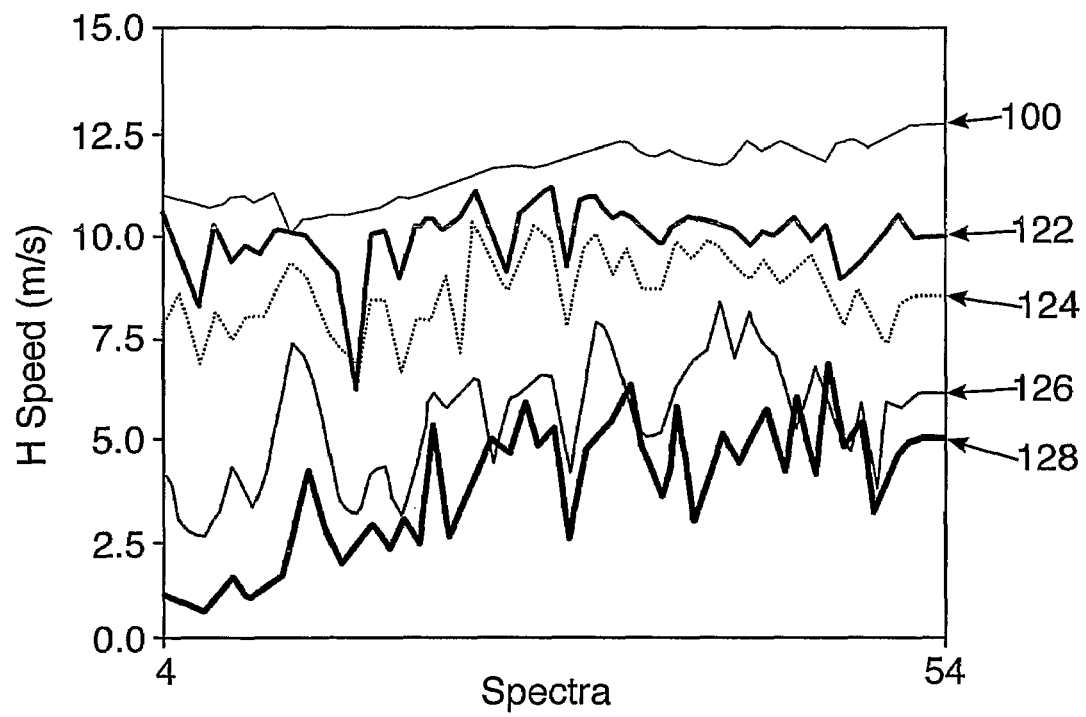

The invention will now be described, by way of example only, with reference to the following drawings in which;

FIG. 1 illustrates the basic principle of Doppler wind lidar operation,

FIG. 2 shows a schematic illustration of a upward pointing, conically scanned wind lidar system in operation, FIG. 3 shows a typical Doppler signal spectrum acquired at one position in a conical scan and from which a line of sight wind velocity value can be extracted, FIG. 4 shows typical wind speed data as a function of angle acquired from a conically scanned Doppler wind lidar with LSS data fit curves calculated using all of the data points and a selected subset of data points, FIG. 5 shows the lidar sensitivity and back scatter intensity for a low cloud base, FIG. 6 illustrates the relative power of the returned signal from aerosol scattering in the probe volume and from the cloud base, FIG. 7 shows a typical return signal acquired by a Doppler wind lidar in the presence of a low cloud base, FIG. 8 is a schematic illustration of a wind lidar system that incorporates a ceilometer, FIG. 9 shows wind speed data as a function of altitude measured by a lidar over a twenty minute period, FIG. 10 illustrates the effect of cloud base contamination of wind speed measurements, FIG. 11 shows wind speed measurements corrected for cloud base back-scatter effects, and FIG. 12 illustrates a wind turbine mounted Doppler wind lidar that is pointed upwind to allow advance wind speed measurements.

Referring to FIG. 1, the basic principle of Doppler wind lidar operation is shown. A coherent lidar device 2 is arranged to direct a laser beam 4 to a certain area, or so-called probe volume 6, in space. Laser radiation back-scattered from atmospheric aerosols (dust, pollen, pollution, salt crystals, water droplets etc) 8 which are carried by the wind in the direction 10 through the probe volume are then detected by the lidar device 2. Measurement of the Doppler frequency shift of the backscattered radiation is achieved by beating (heterodyning) the return signal with a stable local-oscillator beam derived from the laser providing the transmit beam. The Doppler shifted frequency is directly proportional to wind speed, and the lidar thus needs no calibration. More detail about the specific construction of such lidar apparatus can be found elsewhere; for example, see Karlsson et al or Harris et al (ibid).

The coherent lidar device 2 is monostatic; i.e. it has common transmit and receive optics. Adjustment of the combined transmit/receive beam focus allows the range to the probe volume 6 of the device to be controlled. It should be noted that so-called bistatic lidar systems are also known which have separate transmit and receive optics. In bistatic systems, the transmitted and received beam foci are arranged to coincide, with the location of beam intersection. In bistatic systems it is preferable to alter both the focus of the transmit and receive beams and also the "squint" of the system when adjusting the range of the device. Again it should be noted that herein the term "receive beam" is used to denote the region from which any returned light will be directed to the detector. In other words the receive beam is not a beam of photons, but simply a pseudo or virtual beam that defines the volume from which light is received by the system.

Referring to FIG. 2, an upwardly pointing, conically scanned ground based lidar 20 system is shown. In use, the device performs a continuous conical scan 22 about the vertical axis 24 to intercept the wind at a range of angles. This enables horizontal wind speed and direction to be calculated as described in more detail below. Furthermore, adjustment of the laser focus enables wind to be sampled at a range of heights (h) above ground level.

Although only conically scanned lidars are described hereinafter, it should be noted that many other scanning patterns, fixed multiple beam schemes or switched staring beam schemes could be used to determine the true wind velocity vector. As described in co-pending International patent application WO2005/008284, random or pseudo-random scanning is also acceptable provided that the pointing (or look) direction associated with each line of sight velocity value is known with a sufficient degree of accuracy.

To extract Doppler information, the electrical output of the detector of the lidar system is digitally sampled at 50 MHz and the Doppler spectrum is acquired as a 512-point fast Fourier transform (FFT). Next, 256 of these individual FFTs are averaged to produce each wind or Doppler spectrum; this represents a measurement time of 2.6 ms. The atmosphere is effectively frozen on this timescale so that the spectrum displays the instantaneous spatial variation of line-of-sight wind velocity through the probe volume. Spectra are produced at a rate of around twenty-five per second, corresponding to an overall duty cycle of around 6.5%.

FIG. 3 shows a typical example of an acquired Doppler wind spectrum. The Doppler spectrum shows the power spectral density of the return signal as a function of Doppler shifted frequency as detected over the 2.6 ms acquisition time. It can be seen that the peak in the spectrum shows an appreciable spread of wind velocities within the probe volume. If the airflow were completely uniform throughout the entire probe then all measurements would lie within only one or two "bins" of the spectrum. In fact, in FIG. 3 about ten bins contain appreciable signal.

The line of sight wind speed is derived from the spectra of FIG. 3 by an algorithm that calculates the centroid of the spectrum above a pre-determined threshold. A skilled person would recognise that a number of alternative data analysis techniques, such as a peak picking routines etc, could be used. The Doppler frequency shift is then converted to velocity by multiplying by the conversion factor $\lambda/2$, or 0.775 ms$^{-1}$ per MHz: this calibration factor suffers negligible drift over extended periods (<0.2%). For narrow, well-defined spectra such as in FIG. 3 the peak-picking process gives rise to minimal uncertainty. Larger errors are likely when the air flow is more turbulent, although these can be reduced by calculating a running average.

FIG. 4 shows multiple line of sight wind velocity data points represented by crosses and each derived from a spectrum of the type shown in FIG. 3. The wind velocity data points were acquired using a beam offset thirty degrees from the vertical and scanned in azimuth at the rate of one revolution per second. As the beam rotates, it intercepts the wind at different angles, thereby building up a map of wind speed around a disc of air.

In a uniform air flow, a plot of the Doppler line-of-sight velocity ($V_{LOS}$) versus scan angle takes the form of a rectified sine wave, with the peak Doppler values corresponding to upwind and downwind measurement. The line of sight Doppler velocity can be described as a function of scan angle ($\phi$)) by:

$$V_{LOS} = |a\cos(\phi-b)+c| \qquad (1)$$

where horizontal speed (u) and vertical speed (w) are given by $$u = a/\sin 30° \qquad (2a)$$

$$w = c/\cos 30° \qquad (2b)$$

and b is the bearing.

Fitting the acquired line of sight velocity data acquired from the conical scan to the above expression using a least sum of squares (LSS) fitting routine allows horizontal and vertical wind speed and wind bearing data to be repetitively acquired at intervals of around three seconds.

It should be noted that a possible ambiguity of 180° degrees in bearing can be easily resolved with reference to a simple wind-vane reading. Alternatively, the lidar could be arranged to incorporate a direction sensing function by inclusion of a means, for example an acousto-optic modulator of the type described in Harris (ibid), to frequency shift the local oscillator relative to the transmitted beam. In this latter case, the Doppler line-of-sight velocity versus scan angle would be fitted to a (non-rectified) sine curve.

It has however been found from field trials that occasional spurious wind velocity data points (e.g. point 40) are acquired by the system. These points have been found to arise from reflections off solid articles (e.g. birds, insects etc) moving through the probe volume, and/or from light returned from highly scattering objects (e.g. solid moving targets) located away from the probe volume. Although the erroneous points are typically few in number, they have been found to significantly skew the LSS data fit and thus contribute a significant level of uncertainty to the acquired wind speed measurements. Curve 42 illustrates a LSS data fit to all the data point shown on the graph. It can be seen that such errors will skew the fit and reduce the reliability of long term, unattended, wind speed measurements using such a lidar system.

To reduce this error in the acquired wind speed data, the output of the least-squares fitting routine is analysed and those points ("outliers") that lie furthest from the best fit solution are identified. The deviation of the points from the fit, $d=|V_{data}-V_{fit}|$, is taken from the LSS fitting routine, and can be used to eliminate suspect outliers according to one of the following rules:

(i) Remove the N worst points (i.e. those with largest values of d), where N must be a number much less than the number of points acquired per conical scan. For example, if 74 data points were acquired the 2 or 3 points with the highest deviation could be removed from data set. The number of points removed can then be optimised for a particular location.

(ii) Remove all points for which $d>n\times\sigma$ where $\sigma$ is the standard deviation of all values of d for this fit, and n is a number like 6 or 10. The value of n adopted will depend on the particular location and the system being used and can be optimised by experience.

After elimination of the outliers the fitting routine is repeated, and the wind data are computed from the results of this second fit. Curve 44 shows such a fit after outlier point 40 has been identified and omitted from the second fit. It is assumed, and has been shown experimentally, that negligible overall bias will be introduced by the absence of any spurious outliers. Although a two stage fitting process is preferred to minimise the computational load, three or more data fits could alternatively be performed and, say, one outlier eliminated after each fit. A skilled person would also appreciate that although real time data processing is preferred, analysis could also be performed "off-line" using data previously acquired by a lidar system.

The elimination of outliers in the manner described above provides a more resilient anemometer that is not affected by the occasional bird/insect interaction or by the motion of objects within the conical scan path of the device. The lidar can thus be used for long term, unattended, monitoring of wind speed.

In addition to spurious errors of the type described above, it has also been found that lidar systems can provide inaccurate data in certain types of weather. In particular, the presence of a low cloud base has been found to have a detrimental effect on the wind speed measurement accuracy of upwardly pointing lidar systems.

Referring to FIG. 5, the transmit and receive beams 50 of an upward pointing lidar system are illustrated. The transmit and receive beams are focussed on a certain probe volume 54 at a height $H_a$ above the ground. Clouds 56 are also present at a height $H_c$ above ground level. The lidar sensitivity, scattering efficiency and transmit beam power and are shown as a function of the height above ground level by curve 58, curve 60 and curve 62 respectively.

It is also possible to estimate the amount of scatter from the probe volume and cloud in a more quantitative manner. In particular, it is possible to express the total scattering from the normal atmosphere ($S_a$) and the cloud ($S_c$) as:

$$S_a \propto \int_0^{H_c} \beta_a \cdot \frac{I_T^2(h) \cdot \Delta}{(h-H_a)^2 + \Delta^2} dh \quad (3a)$$

$$S_c \propto \int_{H_c}^{\infty} \beta_c \cdot \frac{I_T^2(h) \cdot \Delta}{(h-H_a)^2 + \Delta^2} dh \quad (3b)$$

where h is the height above ground level, $\Delta$ is the change in height away from focus that leads to a 3 dB (i.e. factor of two) reduction in sensitivity, $\beta_a$ and $\beta_c$ are the scattering coefficients of the normal atmosphere and the cloud respectively and $I_T(h)$ is the power of the beam as it passes height h.

FIG. 6 illustrates the ratio of the return signal from the cloud region and the sub-cloud region, as a function of the cloud to atmosphere scattering ratio, for a system focussed at a height of 100 m for three different cloud heights (300 m, 400 m and 500 m). An attenuation length of 50 m has been assumed for light penetrating the cloud. As outlined above with reference to FIG. 5, it should be remembered that the return signal from the sub-cloud atmospheric region is dominated by the return signal from the probe volume.

Hence, for values of Sc/Sa<<1, the aerosol return dominates and the contribution from cloud can be ignored. However, it can be seen from FIG. 6 that, in certain circumstances, the cloud signal dominates the received signal. In other words, as the Sc/Sa ratio approaches unity the problem of the cloud signal dominating the received signal becomes increasingly severe.

FIGS. 5 and 6 show that although the lidar is most sensitive to light returned from the probe volume, a strong signal can be returned from clouds despite the fact they are located a significant distance from the probe volume. This means that, under certain conditions, the measured wind speed can be incorrect as the speed of the clouds dominate the return signal (rather than the wind speed at the chosen altitude). This problem has been found to be most severe when the lidar is focused at the upper limit of its range, when the aerosol back-scatter from the air below the cloud-base is low and when the cloud-base is low.

The effect of low cloud cover on the Doppler spectra acquired for a particular point of a conical scan using a fibre based lidar of the type describe above is illustrated in FIG. 7. It can be seen that in addition to the peak 70 which arises from back-scatter from the probe volume, a second peak 72 is present due to the strong back-scatter from the clouds. Typically the second peak is at higher velocities because clouds generally move at a greater speed than wind in the vicinity of the ground. However, as described in more detail below, this is not always the case.

An automated fitting routine of the type described with reference to FIG. 3 above will typically output incorrect wind speed data if the second peak 72 is present. For example, if the second peak 72 dominates the spectra, the fitting routine is likely to simply ignore the smaller peak and will provide output data indicative of the speed of cloud movement. Alternatively, if the two peaks are of similar magnitude, the fitting routine will typically attempt to find a "best fit" curve for the two peaks which will provide a wind speed value that is somewhere between that of the probe volume and cloud base. In both cases, this introduces a significant and unknown error into the acquired wind speed data. In the case of unattended systems, it is not known when such an error is present (i.e. the presence of a low cloud base typically occurs unpredictably) and thus the level of uncertainty associated with acquired data is also unknown.

Previously, weather conditions would have been monitored to identify the occurrence of a significant cloud return signal based on real-time observation of the actual cloud conditions. Alternatively, operators could have periodically monitored certain characteristics of the wind spectra; for example, the acquired Doppler spectra could be checked for the presence of "double peaks". Although manual techniques can provide acceptable results, the cost of providing an operator (either "on-site" or for analysing acquired data off-line) is prohibitive.

One technique that has been found for overcoming problems associated with cloud returns is to monitor cloud height using a ceilometer. Referring to FIG. 8, an anemometer 80 is shown that includes a laser ceilometer 82 and a wind-profiling fibre lidar 84 of the type described above. The ceilometer 82 provides measurements of atmospheric backscatter as a function of altitude which is used to compute the relative strengths of the cloud and aerosol signals for each lidar measurement.

Ceilometers are known, and several systems are commercially available; for example the Vaisala (registered trademark) CT25K (supplied by Vaisala Oyj, Helsinli, Finland), or the Mesotech CBME40/80 (supplied by Mesotech International Inc., Sacramento, U.S.A.). These systems transmit an upward-looking pulsed laser beam into the atmosphere, and use time-of-flight information to measure the backscatter as a function of altitude. Normally such systems process the acquired backscatter data to provide a measure of cloud height and are used in the vicinity of airports and the like. However, the back-scatter profile measured by such apparatus may be directly extracted and used to improve anemometer performance as described below.

The ceilometer 82 is co-located with the lidar 84 and its output, in the form of a back-scatter profile, is fed to the computer of the lidar system for analysis. A calculation is then performed using the back-scatter profile to assess the probability of there being cloud related problems. In other words, the sensitivity of the lidar 84 as a function of height for a given focus altitude is known. The relative strength of the cloud and probe volume return signals can thus be predicted using equations 3a and 3b and the back-scatter profile measured by the ceilometer. In this manner, wind speed data affected by cloud returns can be eliminated from the acquired data thereby leaving only reliable measurements of wind speed.

In the simplest configuration, the output of the calculation would be a measure of the relative strengths of the cloud and aerosol signal returns, from which a confidence level in the validity of each particular wind speed measurement can be assigned. In many cases, a simple "0" (invalid—cloud signal dominates) or "1" (valid—aerosol signal dominates) is sufficient. Alternatively, a measure of the uncertainty associated with each wind measurement can be assigned.

Ideally, the ceilometer would execute the same conical scan as the lidar in order to ensure the same patches of sky are interrogated. However, an assessment based on an unscanned, upward looking ceilometer will typically provide sufficient information. It should also be noted that most commercially available ceilometer systems operate using a laser wavelength of around 1 μm whilst the fibre lidar system described above operates at 1.55 μm. However, the backscatter profile does not differ significantly at these two wavelengths and any difference can be reduced by appropriate calibration.

The use of a ceilometer provides an unambiguous measure of atmospheric scattering profile, but it has also been found to be possible to analyse the Doppler spectra acquired by the lidar system to ascertain a measure of the uncertainty that is associated with a particular wind speed measurement. For example, higher complexity peak detection techniques could be used to analyse the Doppler spectra and any high speed cloud related signals could be removed from the data or the presence of two or more peaks could trigger a simple "0" code of the type described above to indicate that the cloud signal appears to dominate the acquired data.

As an alternative to using a ceilometer, data from the coherent lidar could be used to determine the backscatter profile. For a focused CW system of the type outlined above, and in conditions of uniform scattering level (i.e. when $\beta$ does not vary with height), the total return signal power is virtually independent of the range at which the lidar is focused. This approximation only breaks down when the range approaches the maximum value at which a beam waist can be produced. Hence, a measure of scattering (i.e. $\beta$) as a function of height can be assessed from any observed variations in signal strength as the lidar focus is changed. The coherent lidar can thus be arranged to determine a measure of the atmospheric backscatter profile, and in particular any contribution to the return signal from cloud, by obtaining a succession of wind speed data from different heights. As described in more detail below, any returns from the cloud base will also have a substantially invariant Doppler shift as the lidar range (e.g. focus) is changed.

The data required to determine the backscatter profile may be acquired during normal wind speed measurement operation, or via the intermittent running of a separate backscatter measurement routine. In either case, the total integrated power in the return signal is evaluated from a succession of spectra acquired at a number of different heights (for example 25 m, 50 m, 100 m, 200 m, 400 m). Typically, the acquisition of such data will take less than one minute and, if necessary, can be repeated many times in order to acquire adequate statistics. The acquired returned power versus height can then be converted to a plot of backscatter versus height via deconvolution with the spatial sensitivity curve (instrumental function) of the lidar taking into account the variation of the instrumental function with height.

This scheme has the advantage that the backscatter is always assessed at the correct laser wavelength and that the measurement is carried out in the most appropriate region of space (e.g. in the same cone in which the lidar is scanned for the wind measurements). The spatial resolution will, however, typically be lower than that which can be obtained using a pulsed system such as a ceilometer.

As described above, under unfavourable weather conditions the contribution to the Doppler signal of an upwardly pointing lidar system may contain returns from cloud that contaminate, or even dominate, the return signal from aerosols in the probe volume at the height of interest. As described above, under "normal" wind profile conditions (i.e. when the cloud has a higher velocity than the wind in the lower atmosphere) this can lead to an overestimate of wind speed. The severity of the cloud signal effect on measured wind speeds has been found to increase for low cloud height, high lidar range settings and when there are low aerosol densities at the desired probe volume height.

It has been found that wind speed errors introduced by the presence of cloud returns can be reduced by identifying the presence of such a cloud return and removing its contribution from any relevant Doppler spectra. This is possible because cloud returns have been found to possess a number of characteristics that allow them to be distinguished from aerosol returns at the desired probe volume. Firstly, the velocity of cloud is usually higher than the velocity of wind in the sub-cloud region. Furthermore, the spectral width of the Doppler peak associated with cloud returns is typically narrower than the peak that is associated with returns from a sub-cloud region. In addition, it has also been found that the Doppler peak height (i.e. the peak intensity of the returned signal) associated with cloud returns has a clear dependence on the lidar range (i.e. the height of the probe volume above the ground) whilst the Doppler shift of any such peak (which is related to the cloud velocity) is substantially independent of the height at which the lidar is focused.

Referring to FIGS. 9 to 11, a technique is described for reducing errors in measured wind speed that are introduced when the lidar is operated in the presence of a low cloud-base.

FIG. 9 illustrates the horizontal wind speed measured by a ground based, conically scanned monostatic lidar system over a 20 minute period. Lines 100, 102, 104, 106 and 108 show the measured wind speed at heights of 300 m, 150 m, 100 m, 50 m and 25 m respectively. The cloud base was observed to be at a height of around 300 m for the duration of the measurements.

As described above with reference to FIGS. 3 and 4, each wind velocity value at each height is determined by acquiring multiple Doppler spectra (of the type shown in FIG. 3) at various points around the scan cone. Line of sight velocity values are then determined by calculating the centroid of each spectrum above a pre-determined threshold. The line of sight velocity values extracted from the spectra are fitted to the expressions described in equations (1) and (2) allowing horizontal and vertical wind speed components to be determined. FIG. 9 illustrates the horizontal wind speed components calculated in such a manner for a number of heights above the ground without any attempt to correct for returns from the cloud base. It can be seen from FIG. 9 that the measured wind speeds at 100 m (line 104) and 150 m (line 102) appear very similar to the measured wind speed at 300 m (line 100).

Referring to FIG. 10, the effect of cloud return contamination on wind speed measurements is illustrated and a technique for reducing such contamination is described.

Figure 10A:
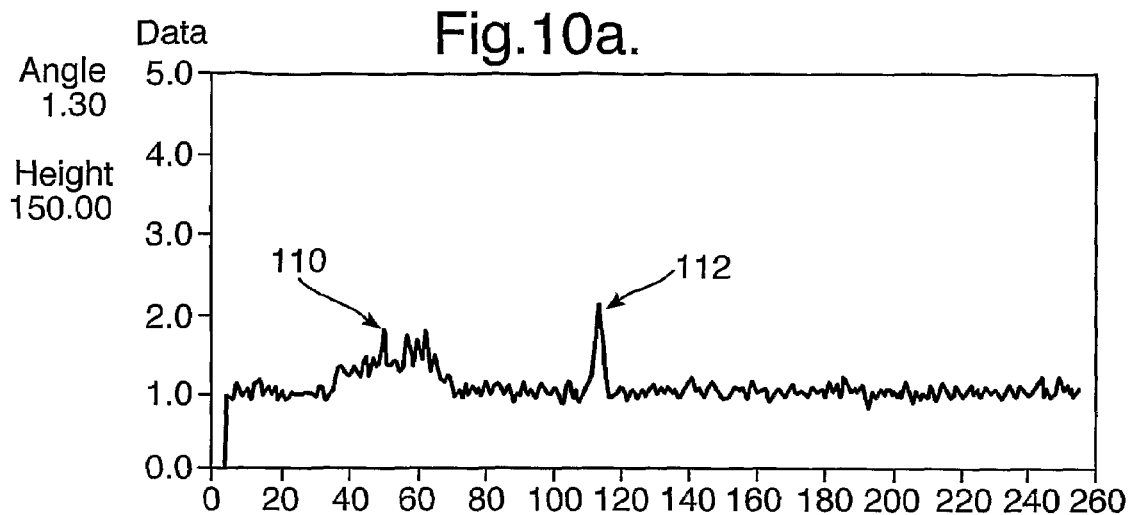

FIG. 10a shows the Doppler spectrum for one measurement point at a measurement height of 150 m. The Doppler spectrum can be seen to contain a broad peak 110 which corresponds to the return signal from the probe volume (i.e. the region 150 m above the ground) and also a sharp peak 112 that arises due to returns from the cloud base (which is at 300 m). Extracting a line of sight wind velocity value from the Doppler spectrum of FIG. 10a by calculating the centroid of the spectra above a pre-determined threshold (i.e. using the technique described with reference to FIG. 3) will, in this low cloud base example, provide a wind velocity value that does not truly represent the velocity at the desired probe volume height of 150 m. In other words, any wind speed calculated in the manner described above using the entire Doppler spectrum may not be indicative of the true wind velocity in presence of a low cloud base.

Figure 10B:
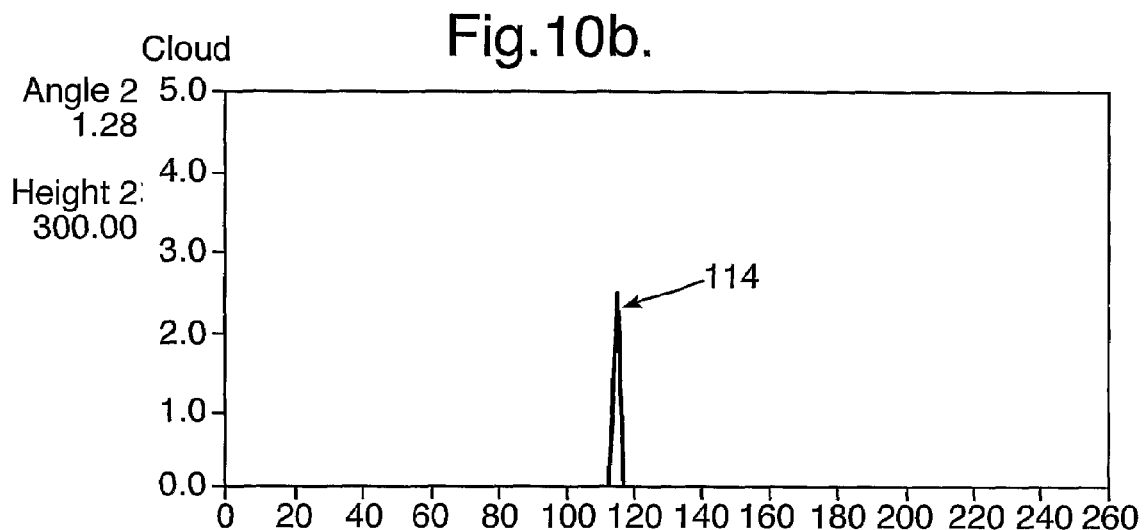

Referring to FIG. 10b, the Doppler spectrum for a measurement point at a height of 300 m above the ground is shown after a suitable thresholding step has been applied. The spectrum of FIG. 10b was acquired at substantially the same scan angle as that used to acquire the spectrum of FIG. 10a. The spectrum shown in FIG. 10b contains a single, sharp, peak 114 that arises due to back-scatter of the laser radiation from the cloud. It can be seen from FIGS. 10a and 10b that the height (i.e. peak return intensity) of the cloud peak 114 of FIG. 10b is greater than that of the cloud return peak 112 of FIG. 10a, but that the Doppler shift of both peaks is almost identical.

Figure 10C:
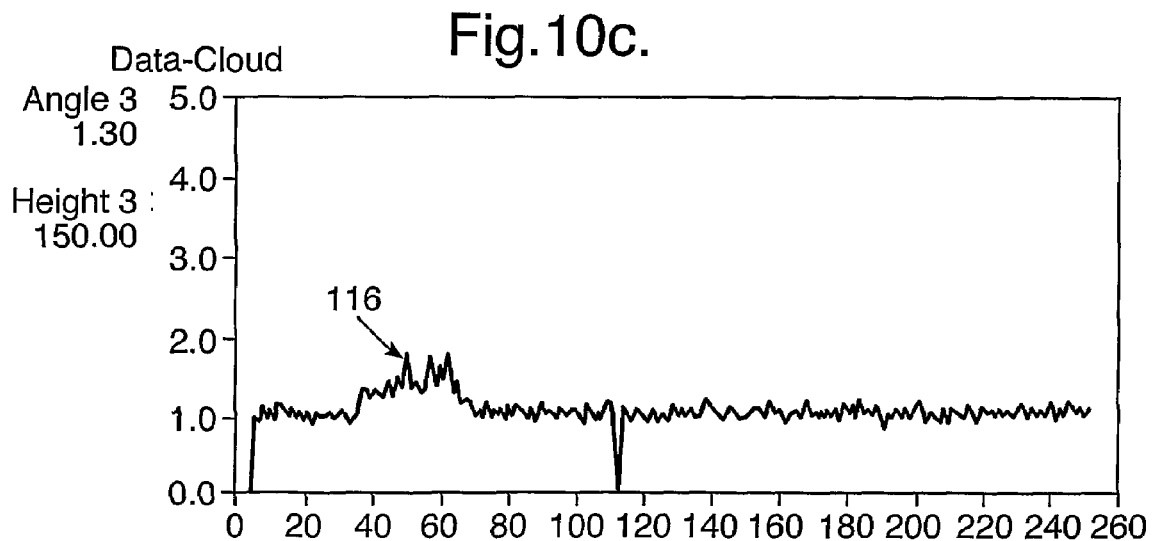

The spectrum of FIG. 10b is subtracted from the spectrum of FIG. 10a to produce the modified spectrum shown in FIG. 10c. Note that the spectrum of FIG. 10b is thresholded prior to the subtraction step to prevent additional noise being introduced to the modified spectrum. A line of sight wind speed velocity is calculated from the data of FIG. 10c by determining the centroid of the spectrum above a pre-determined threshold. It can be seen that the cloud peak is removed from the modified data of FIG. 10c and hence the calculated line of sight wind velocity value reflects the true wind speed at the probe volume (i.e. at 150 m above the ground). In other words, the wind speed measurements have been corrected to remove any deleterious effects due to cloud base returns.

The data correction technique described with reference to FIG. 10 was repeated for each of the line of sight Doppler spectra from which the wind speed data at heights of 25 m, 50 m, 100 m and 150 m of FIG. 9 were calculated. The Doppler spectra acquired from cloud returns (i.e. at a height of 300 m) were used in the correction process. The line of sight velocity values extracted from the spectra were refitted to the expressions described in equations (1) and (2) allowing horizontal and vertical wind speed components to be determined. It should be noted that the outlier removal technique described above was also applied during the line of sight velocity fitting process.

FIG. 11 shows the "corrected" horizontal wind speed components at heights of 25 m (line 128), 50 m (line 126), 100 m (line 124) and 150m (line 122) and the cloud velocity data at 300 m (line 100).

It can be seen from FIG. 11 that the variation in wind velocity with altitude is more representative of the actual wind profile during the measurements. In particular, the "bunching" together of the higher altitude wind speed measurements (e.g. 100 m, 150 m and 300 m) seen in FIG. 9 has been removed. This method thus removes cloud effects from wind speed measurements without relying on the cloud moving at a greater velocity than wind below the cloud base.

A number of variations to the above method would now be apparent to the skilled person. For example, it would be possible to:

(i) arrange the lidar to acquire Doppler spectra at an additional height (e.g. 300 m) after measurements at the maximum height of interest (say 150 m).

(ii) For each azimuth angle (around scan) subtract the 150 m spectrum from the 300 m spectrum thereby producing a resulting spectrum with a large positive component due to cloudbase returns (if there are any).

(iii) Apply suitable thresholding to identify bins occupied by the cloud.

(iv) Eliminate the cloud component by rejecting all bins in the 150 m (and lower altitude) spectra that correspond to the bins occupied by the cloud.

(v) Run centroiding on the corrected spectra and fit data as described above to determine line of sight velocity values.

On consideration of the teachings contained herein, the skilled person would also appreciate the various modifications and alternative methods that could be applied to the above described techniques to reduce cloud base effects on lidar wind speed measurements.

It should be noted that the above data analysis techniques are not only applicable to upwardly pointing lidar systems. The techniques may be applied to wind speed measurement lidar systems of any orientation. Furthermore, it should be noted that processing of Doppler spectra may be performed in real time (e.g. by the computer controlling the lidar) or off-line using previously recorded data.

Referring to FIG. 12, a Doppler wind lidar 90 mounted on the nacelle of a wind turbine 92 is shown. The lidar 90 is pointed upwind, through the region swept by the blades of the turbine, to provide advance wind speed measurements. The lidar 90 may be scanned, e.g. a conical scan may be performed, to measure different wind velocity components. Such advance wind speed measurements may be used for turbine control or to provide gust warnings to protect the turbine from damage due to gusts of wind.

The reliability of wind speed data acquired from the lidar 90 can, as with upwardly pointing systems, also suffer from erroneous wind speed data points. In particular, solid objects (birds, insects, aircraft etc) may move across the field of view of the lidar and thus provide a strong return signal even when a long distance from the probe volume. The techniques described above with reference to FIG. 4 in which "outlier" data points are removed are thus also advantageous when applied to horizontally pointed lidar systems. In the case of turbine mounted lidar systems, such techniques are particularly advantageous as they allow the removal of any spurious data points that are produced by reflection of light off the turbine blades, reflections from the blades of other turbines in the wind farm or from any wiper system used to keep the lidar output optics free from rain or dirt.

Furthermore, although the problems associated with a low cloud base are unlikely to prove problematical with a horizontally pointing system, fog banks or clouds of smoke may produce analogous errors. In such cases, the provision of a ceilometer or cloud base correction technique as described above would also prove advantageous.

The invention claimed is:

1. A coherent laser radar device for atmospheric wind speed measurement comprising:
   a transmitter arranged to focus a beam of light to a plurality of remote probe volumes, said plurality of remote probe volumes comprising at least one measurement remote probe volume and at least one reference remote probe volume,
   a receiver arranged to detect back-scattered light, and
   an analyser arranged to calculate wind speed at the remote probe volume from the Doppler shift in frequency of the detected back-scattered light, wherein the analyser is arranged to use Doppler frequency characteristics of the back-scattered light detected when the transmitter is focused to said at least one reference remote probe volume during the calculation of wind speed at each of said at least one measurement remote probe volume to correct for any Doppler frequency components of the detected back-scattered light that arise from back-scatter off cloud located at a range greater than the range of the remote probe volume.

2. A device according to claim 1 wherein the transmitter comprises a variable focus mechanism.

3. A device according to claim 2 that is arranged to sequentially measure wind speed at a plurality of measurement remote probe volumes, wherein each of said plurality of measurement remote probe volumes is at range less than a first range limit.

4. A device according to claim 3 wherein said at least one reference remote probe volume is at a range greater than said first range limit.

5. A device according to claim 1 wherein the analyser is arranged to produce Doppler spectra comprising the intensity of the detected back-scattered light as a function of Doppler shift frequency for each measurement at each of said measurement and reference remote probe volumes, wherein the calculation of wind speed comprises subtracting at least one reference Doppler spectrum from each of the measurement Doppler spectra.

6. A device according to claim 1 further comprising an atmospheric back-scatter profiler arranged to measure the back-scatter cross-section of the atmosphere as a function of range.

7. A device according to claim 6 wherein the analyser is arranged to take the back-scatter profile measured by the atmospheric back-scatter profiler and to use said profile to ensure the calculated wind speed is corrected for any Doppler frequency components of the detected back-scattered light that arise from back-scatter off cloud located at a range greater than the range of the remote probe volume.

8. A device according to claim 1 wherein scanning means are provided to scan the beam of light transmitted by the transmitter within the remote probe volume.

9. A device according to claim 8 wherein the analyser is arranged to determine a line of sight wind velocity value for a plurality of known scan positions within the remote probe volume and to calculate at least one wind velocity component at the remote probe volume by fitting the plurality of line of sight velocity values to a predetermined function.

10. A device according to claim 9 wherein the analyser is arranged to ensure that each calculated line of sight velocity value is corrected for any Doppler frequency components of the detected back-scattered light that arise from back-scatter off cloud located at a range greater than the range of the remote probe volume.

11. A device according to claim 9 wherein the analyser is arranged such that one or more line of sight velocity values acquired during the scan are omitted from the calculation of the at least one wind velocity component.

12. A device according to claim 1 wherein, during use, the focus of the receive beam is arranged to coincide with the focus of the transmit beam.

13. A device according to claim 1 that is arranged for ground based, upwardly directed, operation.

14. A device according to claim 1, wherein the analyzer is arranged to use the Doppler frequency data acquired from at least two reference remote probe volumes in correcting the Doppler frequency data from a measurement remote probe volume.

15. A method for calculating atmospheric wind speed comprising the steps of (i) taking Doppler frequency data acquired by a coherent laser radar device from a plurality of remote probe volumes and forming a first set of Doppler spectra acquired from one or more measurement probe volumes at a range less than a first range limit and a second set of Doppler spectra acquired from one or more remote probe volumes at a range greater than said first range limit, and (ii) calculating wind velocity at the remote probe volume of the coherent laser radar device from said Doppler frequency data, wherein step (ii) comprises the step of using said second set of Doppler spectra to ensure the wind speed calculated from each of said first set of Doppler spectra is corrected for any Doppler frequency components that arise from back-scatter off cloud located at a range greater than the range of the remote probe volume.

16. A method according to claim 15 wherein the calculation of wind speed comprises the step of subtracting a Doppler spectrum of said second set from each Doppler spectra of said first set.

17. A method according to claim 15 and comprising the additional step of taking a back-scatter profile measured by an atmospheric back-scatter profiler located in the vicinity of the coherent laser radar device and using the back-scatter profile to monitor said Doppler frequency data for the presence of any Doppler frequency components that arises from back-scatter off cloud located at a range greater than the range of the remote probe volume.

18. A method according to claim 15 in which said Doppler frequency data comprises a plurality of Doppler spectra acquired from each remote probe volume, wherein each of said plurality of Doppler spectra are acquired from a known scan position within said remote probe volume.

19. A method according to claim 18 in which a line of sight velocity value is calculated from each Doppler spectra of each scan position within said remote probe, wherein the step of calculating wind velocity at a remote probe volume comprises the step of fitting at least some of said line of sight velocity values to a predetermined function.

20. A method according to claim 19 wherein the at least some line of sight velocity values selected for use in the step of calculating the at least one wind velocity component at a remote probe volume comprise line of sight velocity values having a deviation from an initial fit less than a predetermined amount.

21. A method according to claim 19 wherein the at least line of sight velocity values selected for use in the step of calculating the at least one wind velocity component at a remote probe volume exclude the N line of sight velocity values having the highest deviation from an initial fit, wherein N is a predetermined integer greater than or equal to one and less than the number of line of sight velocity values.

22. A computer program product comprising a computer readable storage medium containing computer readable instructions for implementing the method of claim 15.

23. A computer program carrier containing in machine readable form a computer program suitable for implementing the method of claim 15.

24. A computer suitably programmed to implement the method of claim 15.

25. A device according to claim 15, wherein at least two Doppler spectra from the second set are used to ensure the wind speed calculated from a Doppler spectrum of the first set is corrected for back scatter off of a cloud.

* * * * *